United States Patent [19]
Venable

[11] Patent Number: 5,953,960
[45] Date of Patent: Sep. 21, 1999

[54] STEERING APPARATUS

[75] Inventor: Frederick D. Venable, Lafayette, Ind.

[73] Assignee: TRW Inc., Lyndhurst, Ohio

[21] Appl. No.: 08/814,402

[22] Filed: Mar. 11, 1997

[51] Int. Cl.$^6$ .............................. F16H 55/28; B62D 5/22
[52] U.S. Cl. ................................ 74/409; 74/422; 74/498; 74/398
[58] Field of Search ............................. 74/422, 440, 498, 74/398, 409, 499

[56] References Cited

U.S. PATENT DOCUMENTS

| | | | |
|---|---|---|---|
| 3,252,348 | 5/1966 | Folkerts | 74/498 X |
| 3,665,783 | 5/1972 | Arnold | 74/498 |
| 3,884,091 | 5/1975 | Hay . | |
| 5,211,069 | 5/1993 | Wada et al. | 74/498 X |
| 5,341,701 | 8/1994 | Krom et al. . | |

*Primary Examiner*—Rodney H. Bonck
*Assistant Examiner*—William C Joyce
*Attorney, Agent, or Firm*—Tarolli, Sundheim, Covell, Tummino & Szabo

[57] ABSTRACT

An apparatus (10) for use in turning steerable vehicle wheels includes a rack gear (14) and a sector gear (16) which are disposed in meshing engagement. A lash adjustment assembly (46) is operable to move the sector gear (16) to reduce clearance between teeth (18 and 20) on the rack and sector gears upon rotation of the sector gear to an initial or on-center condition. The lash adjustment assembly (46) includes a force transmitting member (60) having a threaded end portion (90) which engages threads (92) on the sector gear (16). A power spring (100) is connected with the force transmitting member (60) and stores energy to rotate the force transmitting member relative to the sector gear (16). When the sector gear (16) moves to the on-center condition, an index pin (150) is moved relative to an index wheel (138) to release the force transmitting member (60) for rotation through a predetermined distance relative to the sector gear (16). When the force transmitting member (60) has rotated through the predetermined distance, an index pin (152) retains the index wheel (138) and force transmitting member against rotation.

10 Claims, 3 Drawing Sheets

STEERING APPARATUS

BACKGROUND OF THE INVENTION

The present invention relates to a lash adjustment assembly which is effective to reduce clearance between teeth of gears in a vehicle steering apparatus.

It has previously been suggested that a lash adjustment assembly could be provided in association with gears of a vehicle steering apparatus to compensate for gear tooth wear. This suggested lash adjustment assembly includes a nut which is rotatably mounted in a recess in a sector gear. A force transmitting member is mounted in the recess and has external threads which engage internal threads on the nut. A helical spring is connected between the nut and the force transmitting member to continuously urge the nut to rotate relative to the force transmitting member.

In the suggested lash adjustment assembly, a ratchet mechanism is connected with the nut and is effective to hold the nut against rotation until the sector gear is rotated to an on-center condition. When the sector gear moves to an on-center condition, the nut is released for rotation relative to the sector gear. Rotation of the nut moves the sector gear to reduce clearance between teeth on the sector gear and teeth on a mating gear. A steering apparatus having this construction is disclosed in U.S. patent application Ser. No. 08/905,172 filed Aug. 1, 1997 by Wendell Lee Gilbert and entitled "Steering Apparatus" (Attorney Docket No. TRW (RG)-3268) and assigned to TRW Inc.

SUMMARY OF THE INVENTION

The present invention provides a new and improved apparatus for use in turning steerable vehicle wheels. The apparatus includes a pair of gears having teeth disposed in meshing engagement. An adjustment assembly is provided to reduce clearance between teeth of the gears. The adjustment assembly is operable to move one of the gears through a predetermined distance upon rotation of the one gear to an initial condition, in which there is a minimal loading of the gear teeth.

The adjustment assembly includes a force transmitting member having a thread convolution which engages a thread convolution on the one gear. A spring is connected with the force transmitting member and the one gear. The spring effects rotation of the force transmitting member when the one gear moves to the initial condition. Rotation of the force transmitting member, under the influence of the energy stored in the spring, is effective to move the one gear to reduce clearance between the teeth of the gears.

BRIEF DESCRIPTION OF THE DRAWINGS

The foregoing and other features of the present invention will become more apparent to one skilled in the art to which the present invention relates upon consideration of the following description of the invention with reference to the accompanying drawings, wherein.

DESCRIPTION OF ONE SPECIFIC PREFERRED EMBODIMENT OF THE INVENTION

General Description

Figure 1:
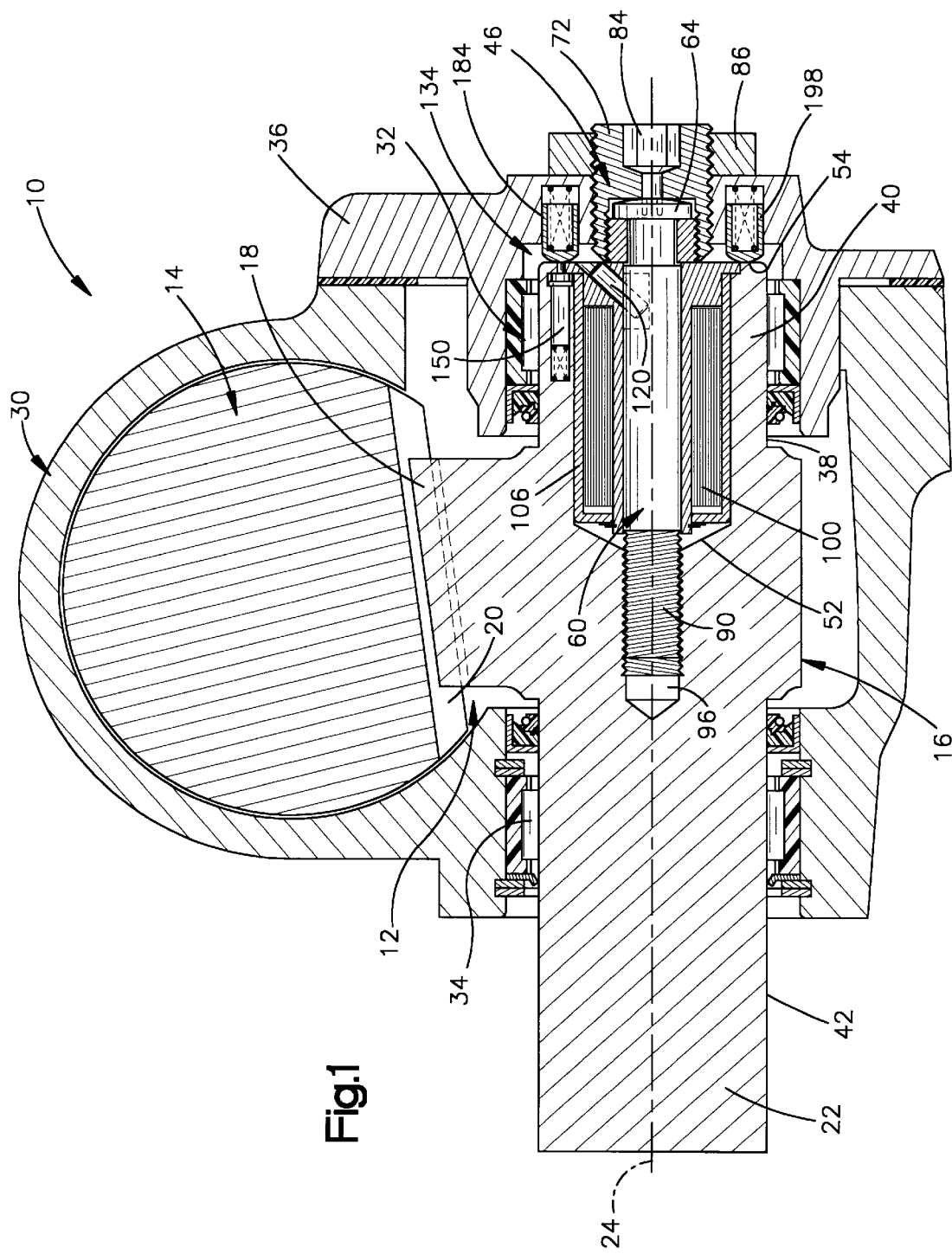
FIG. 1 is a fragmentary sectional view of an apparatus constructed in accordance with the present invention for use in turning steerable vehicle wheels.

An apparatus 10 (FIG. 1) for use in turning steerable vehicle wheels, includes a gear set 12 which actuatable by a power steering motor (not shown). The gear set 12 includes a rack gear 14 connected with a piston of the power steering motor. The gear set 12 also includes a sector gear 16 which has teeth 18 disposed in engagement with teeth 20 on the rack gear 14. The sector gear 16 has an output or cross shaft 22 which is connected with a pitman arm of a steering linkage. The sector gear 16 is rotatable about a central axis 24.

The rack and sector gears 14 and 16 are enclosed by a housing 30. The sector gear 16 is supported for rotation about the axis 24 by an inner bearing assembly 32 and an outer bearing assembly 34. The inner bearing assembly 32 is mounted on an end wall 36 of the housing. The inner bearing assembly 32 engages a cylindrical outer side surface 38 on an inner end portion 40 of the sector gear 16. The outer bearing assembly 34 engages a cylindrical outer side surface 42 on the output shaft 22.

The general construction of the rack gear 14 and sector gear 16 and the manner in which they cooperate with a power steering motor is the same as is disclosed in U.S. Pat. Nos. 3,741,074 and 4,164,892. However, the rack and sector gears 14 and 16 could have a different construction and could be associated with a different type of power steering motor if desired.

In accordance with a feature of the invention, a lash adjustment assembly 46 (FIG. 1) is provided to compensate for gear tooth wear. The lash adjustment assembly 46 compensates for gear tooth wear by reducing clearance between the teeth 18 and 20 on the sector gear 16 and rack gear 14.

The lash adjustment assembly 46 is effective to reduce the clearance between the teeth 18 and 20 on the sector gear 16 and rack gear 14 upon operation of the steering apparatus 10 to an on-center or initial condition. When the steering apparatus 10 is in an on-center condition, the steerable vehicle wheels (not shown) are in a straight ahead orientation so that the vehicle is moving straight down a road. At this time, there is minimal loading between the sector gear teeth 18 and rack gear teeth 20.

When the apparatus 10 is in an on-center or initial condition, the vehicle steering wheel (not shown) can be rotated to effect turning movement of the vehicle toward either the left or the right. As the vehicle wheels are turned, the lash adjustment assembly 46 is not effective to reduce the clearance between the sector gear teeth 18 and rack gear teeth 20. However, as soon as the steering apparatus 10 is operated back to the initial or on-center condition, the lash adjustment assembly 46 is effective to move the sector gear 16 along its axis 24 to reduce excessive clearance between the sector gear teeth 18 and rack gear teeth 20.

In accordance with another feature of the invention, the lash adjustment assembly 46 is operable to move the sector gear 16 through the same predetermined distance along the axis 24 each time the apparatus 10 is operated to its initial condition with excessive clearance between the sector gear teeth 18 and rack gear teeth 20. After the sector gear 16 has been moved through the predetermined distance along the axis 24 to reduce clearance between the sector gear teeth 18 and rack gear teeth 20, the lash adjustment assembly 46 blocks further movement of the sector gear along the axis 24. This minimizes any tendency for binding to occur between the sector gear teeth 18 and rack gear teeth 20 during turning of the steerable vehicle wheels.

In accordance with another feature of the present invention, a compact mounting arrangement is provided between the lash adjustment assembly 46, sector gear 16, and end wall 36 of the housing 30. Thus, a major portion of the lash adjustment assembly 46 is disposed in a recess 52 in the sector gear 16. The lash adjustment assembly 46 extends axially outward from a circular end face 54 on the inner end portion 40 of the sector gear 16. The portion of the lash adjustment assembly 46 which extends outward from the end face 54 of the sector gear 16 transmits reaction forces to the end wall 36 of the housing 30 when the sector gear 16 is moved axially relative to the rack gear 14.

Lash Adjustment Assembly—Force Transmission

The lash adjustment assembly 46 includes a one-piece force transmitting member 60 (FIG. 2) which transmits force between the end wall 36 of the housing 30 and the sector gear 16. The force transmitting member 60 has a circular head end portion 64 which is held against axial movement relative to the end wall 36 of the housing 30. However, the force transmitting member 60 is rotatable about the axis 24 relative to the end wall 36 of the housing 30.

The head end portion 64 of the force transmitting member 60 includes a cylindrical flange 66 which is integrally formed with and is coaxial with a cylindrical neck portion 68. The head end portion 64 of the force transmitting member 60 is rotatably held against axial movement by a plug assembly 72.

The plug assembly 72 includes a main plug 74 and a retainer plug 76. The main plug 74 has external threads 80 (FIG. 2) which engage internal threads in the end wall 36 of the housing. A hexagonal socket 84 is formed in the main plug 74 in a coaxial relationship with the external threads 80. A tool is engageable with the socket 84 to rotate the main plug relative to the end wall 36 of the housing 30. A lock nut 86 engages the external threads on the main plug 74 and holds the main plug against rotation relative to the end wall 36 of the housing 30.

The retainer plug 76 (FIG. 2) has external threads which engage internal threads on the main plug 74. The retainer plug 76 engages the flange 66 on the head end portion 64 of the force transmitting member 60 to hold the force transmitting member against axial movement relative to the main plug 74 and end wall 36 of the housing. However, it should be understood that the head end portion 64 of the force transmitting member 60 is freely rotatable relative to the plug assembly 72 and end wall 36 of the housing 30.

Rotation of the force transmitting member 60 about the central axis 24 of the sector gear 16 is effective to move the sector gear along its central axis. The force transmitting member 60 has an inner end portion 90 with an external thread convolution 92. The external thread convolution 92 engages an internal thread convolution 94 (FIG. 2) on the sector gear 16. The internal thread convolution 94 on the sector gear 16 is formed in a cylindrical inner end portion 96 (FIG. 1) of the recess 52.

Upon rotation of the force transmitting member 60 about its central axis 24 (FIG. 2), the interaction between the external thread convolution 92 and internal thread convolution 94 causes the sector gear 16 to move leftward (as viewed in FIG. 2) along the central axis 24 of the force transmitting member 60. This movement of the sector gear 16 is effective to reduce clearance between the sector gear teeth 18 and rack gear teeth 20 (FIG. 1).

A power spring 100 (FIG. 2) stores energy to rotate the force transmitting member 60 relative to the sector gear 16. In the illustrated embodiment of the invention, the power spring 100 is a flat spiral power spring having a cylindrical configuration. The force transmitting member 60 is disposed in a coaxial relationship with the power spring 100 and extends through a cylindrical central opening 102 in the power spring 100. The power spring 100 is disposed in a generally cylindrical main portion 104 of the recess 52.

Figure 2:
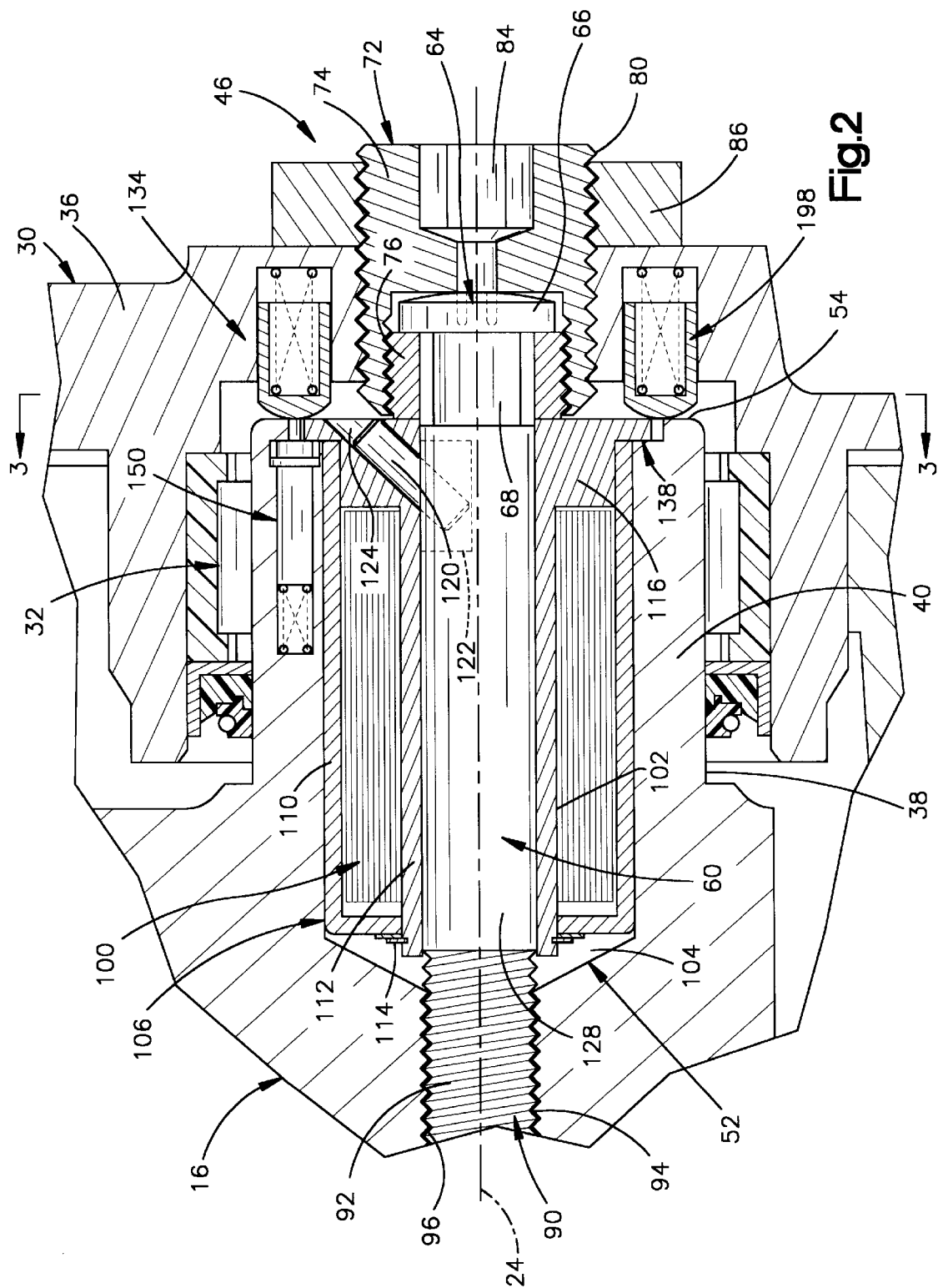
FIG. 2 is an enlarged fragmentary sectional view of a lash adjustment assembly which forms a portion of the apparatus of FIG. 1.

The power spring 100 is enclosed by a casing assembly 106 (FIG. 2). The casing assembly 106 includes a cylindrical outer wall 110 and a cylindrical inner wall 112. The inner wall 112 is coaxial with the outer wall 110 and force transmitting member 60. Retainers 114 cooperate with a radially outwardly projecting end portion 116 on the inner wall 112 of the casing assembly 106. The retainers 114 hold the outer wall 110 against axial movement relative to the inner wall 112 of the casing assembly 106 while enabling the inner wall 112 of the casing assembly to rotate relative to the outer wall 110.

The outer wall 110 of the casing assembly 106 is fixedly connected with the sector gear 16. In the illustrated embodiment of the invention, the outer wall 110 of the casing assembly 106 is fixedly connected with the sector gear 16 by an interference fit between a cylindrical outer side surface of the outer wall 110 of the casing assembly 106 and a cylindrical inner side surface of the main portion 104 of the recess 52. However, the outer wall 110 of the casing assembly 106 could be fixedly connected with the sector gear 16 in a different manner if desired.

The flat spiral power spring 100 has a radially outer end portion which is fixedly connected to the outer wall 110 of the casing assembly 106. In addition, the power spring 100 has an inner end which is fixedly connected with the inner wall 112 of the casing assembly 106. The power spring 100 is completely enclosed by the casing assembly 106 and can be readily inserted into the main portion 104 of the recess 52 in the sector gear 16.

A cylindrical retainer pin 120 (FIG. 2) extends into a slot 122 formed in the force transmitting member 60. The cylindrical pin 120 is also disposed in a cylindrical opening 124 formed in the end portion 116 of the inner wall 112 of the casing assembly 106. The retainer pin 120 interconnects the inner wall 112 of the casing assembly 106 and the force transmitting member 60 to hold the inner wall 112 of the casing assembly against rotation relative to the force transmitting member 60.

The pin 120 (FIG. 2) allows the casing assembly 106 and power spring 100 to move along the axis 24 of the force transmitting member 60. To this end, the pin 120 is movable along the slot 122 in a direction parallel to the axis 24. When the sector gear 16 is moved by the interaction between the external thread convolution 92 on the force transmitting member 60 and the internal thread convolution 94 on the sector gear 16, the pin 120 moves toward the left (as viewed in FIG. 2) along the slot 122.

It is contemplated that it may be desired to insert the casing assembly 106 and power spring 100 into the main portion 104 of the recess 52 without having the force transmitting member 60 extending through the casing assembly 106 and without having the pin 120 extending through the opening 124 in the end portion 116 of the casing assembly. After the casing assembly 106 has been pressed into the sector gear 16 to obtain an interference fit between the outer wall 110 of the casing assembly and the sector gear, the force transmitting member 60 is moved axially through the casing assembly 106 and turned into the internal thread convolution 94 in the sector gear 16. At this time, the power spring 100 is in a relaxed condition.

The inner wall 112 of the casing assembly 106 may then be rotated relative to the force transmitting member 60 and outer wall 110 of the casing assembly 106 to wind the power spring 100. After the power spring 100 has been wound to a desired extent, the retainer pin 120 is inserted through the cylindrical opening 124 into the slot 122 in the force transmitting member 60.

Index Assembly

In accordance with a feature of the present invention, an index assembly 134 (FIG. 2) is operable to control axial movement of the sector gear 16 relative to the rack gear 14 (FIG. 1). Each time the sector gear 16 moves to the on-center condition, the index assembly 134 (FIG. 2) enables the force transmitting member 60 to be rotated through a predetermined distance relative to the sector gear 16 by the power spring 100. This limits the extent of rotation of the external thread convolution 92 on the force transmitting member 60 relative to the internal thread convolution 94 on the sector gear 16. Limiting relative rotation between the internal and external thread convolutions 94 and 92 limits the distance through which the power spring 100 is effective to move the sector gear 16 toward the left (as viewed in FIG. 2).

During subsequent movement of the sector gear to an off-center condition, the index assembly 134 blocks transmission of force from the power spring 100 to the force transmitting member 60. Therefore, during turning of steerable vehicle wheels, the index assembly 134 prevents the lash adjustment assembly 46 from attempting to reduce clearance between the sector gear teeth 18 and rack gear teeth 20. This tends to minimize interference between the sector gear teeth 18 (FIG. 1) and rack gear teeth 20 as the sector gear 16 is rotated relative to the rack gear 14.

Figure 3:
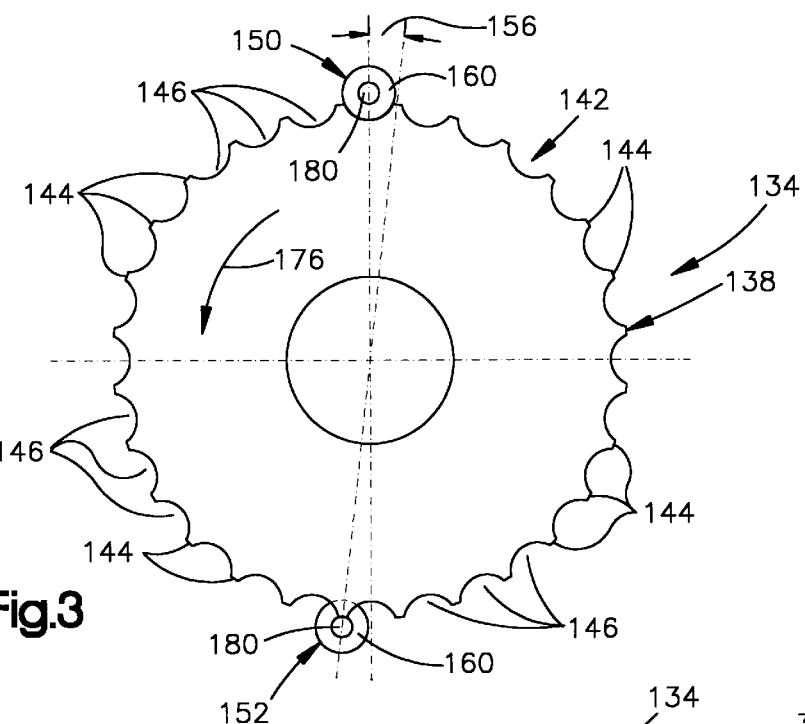
FIG. 3 is a schematic illustration, taken generally along the line 3—3 of FIG. 2, illustrating the relationship between an index wheel and a pair of index pins in the lash adjustment assembly.

The index assembly 134 includes an index wheel or gear 138 (FIGS. 2 and 3). The index wheel 138 (FIG. 2) is integrally formed as one piece with the end portion 116 of the inner wall 112 of the casing assembly 106.

The index wheel 138 is connected to and held against rotation relative to the force transmitting member 60 by the retainer pin 120 (FIG. 2). However, the retainer pin 120 extends into the slot 122 in the force transmitting member 60. This allows the index wheel 138 to move axially toward the left (as viewed in FIG. 2) along the force transmitting member 60. This movement occurs when the clearance between the sector gear teeth 18 (FIG. 1) and rack gear teeth 20 is to be reduced.

The index wheel 138 includes an annular array 142 (FIG. 3) of radially projecting teeth 144. The teeth 144 are separated by recesses 146. The recesses 146 have an arcuate configuration corresponding to the configuration of a portion of a circle. The annular array 142 of teeth 144 and recesses 146 in the index wheel 138 has a central axis which is coincident with the central axis 24 (FIG. 2) of the force transmitting member 60 and sector gear 16.

A pair of index pins or plungers 150 and 152 (FIG. 3) cooperate with the teeth 144 and recesses 146 on the periphery of the index wheel 138 to limit the extent of rotation of the index wheel relative to the sector gear 16. Thus, each time the sector gear 16 moves to the on-center condition, the index pins 150 and 152 cooperate with the teeth 144 and recesses 146 on the index wheel 138 to limit the extent of rotation of the index wheel to an arcuate distance indicated at 156 in FIG. 3. The arcuate distance 156 is equal to one-half of the angular pitch of the teeth 144 on the periphery of the index wheel 138.

Figure 4:
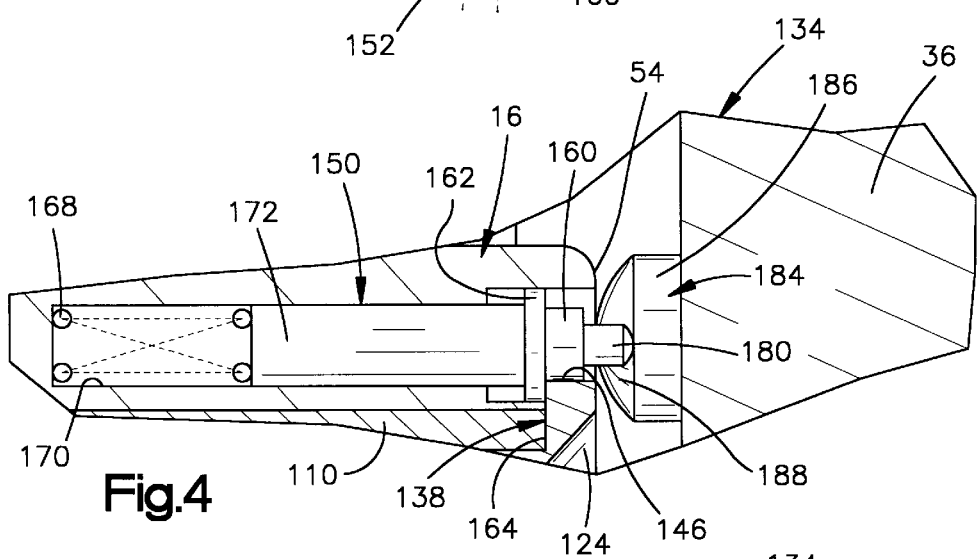
FIG. 4 is an enlarged fragmentary sectional view that illustrating the manner in which one of the index pins holds the index wheel against rotation.

When the index pin 150 is in the engaged position shown in FIGS. 3 and 4, a cylindrical body 160 of the index pin 150 is disposed in engagement with a recess 146 in the index wheel 138. At this time, an annular flange 162 (FIG. 4) on the index pin 150 is disposed in abutting engagement with an annular inner side surface 164 of the index wheel 138. A helical coil biasing spring 168 is disposed in a cylindrical recess 170 in the sector gear 16. The spring 160 presses against a cylindrical shank portion 172 of the index pin 150 to thereby press the flange 162 against the index wheel 138.

Engagement of the cylindrical body 160 (FIG. 4) of the index pin 150 with the recess 146 in the index wheel 138 enables the index pin 150 to hold the index wheel against rotation under the influence of the power spring 100 (FIG. 2). The power spring 100 is constantly applying force to the inner wall 112 of the casing 106 and the index wheel 138. This force constantly urges the index wheel 138 to rotate in a counterclockwise direction, as indicated by the arrow 176 in FIG. 3. Engagement of the cylindrical body 160 of the index pin 150 with the recess 146 (FIG. 4) in the index wheel 138 holds the index wheel against rotation. At this time, a cylindrical head end portion 180 of the index pin 150 projects axially outward from the index wheel 138 toward the housing end wall 36, that is, toward the right as viewed in FIG. 4.

Figure 5:
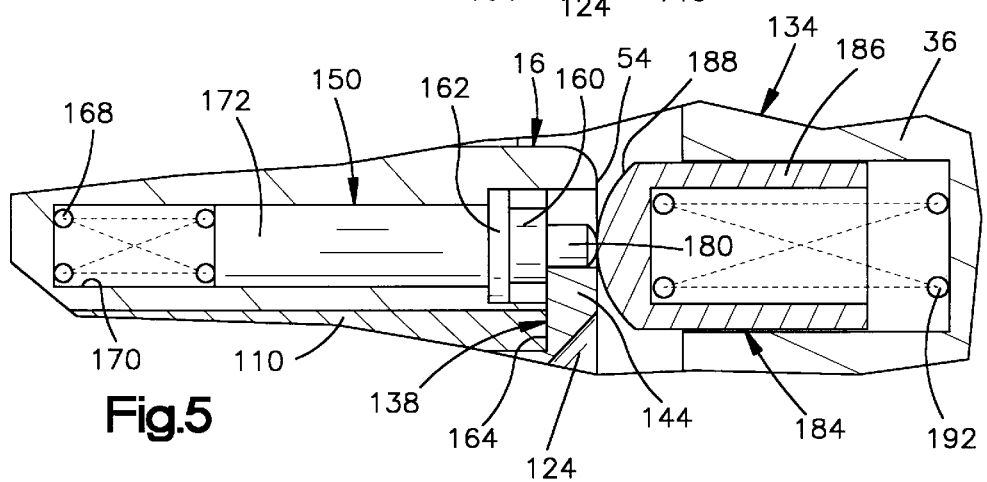
FIG. 5 is an enlarged fragmentary sectional view, generally similar to FIG. 4, illustrating the manner in which an actuator member moves the index pin to release the index wheel for rotation.

Upon rotation of the sector gear 16 to an on-center or initial condition, the head end portion 180 on the index pin 150 is moved into axial alignment with an actuator member or plunger 184 (FIG. 5). As this occurs, the actuator member 184 moves the index pin 150 axially inward along a path extending parallel to the axis 24. The index pin 150 is toward the left as viewed in FIG. 4, to the disengaged position shown in FIG. 5. When the index pin 150 is in the disengaged position, the index pin is ineffective to hold the index wheel 138 against rotation relative to the sector gear 16.

The actuator member 184 (FIG. 5) includes a cylindrical body 186 and an arcuate cam surface 188. The cam surface 188 has a hemispherical configuration. A helical coil spring 192 is stronger than the coil spring 168 and urges the actuator member 184 to the extended position shown in FIG. 5.

During steering of the vehicle and rotation of the sector gear 16, an annular array 142 of teeth 144 and recesses 146 on the index wheel 138 are moved past the actuator member 184. As the sector gear 16 moves to the on-center condition, the actuator member 184 moves from a position offset to one side of the index pin 150 (FIG. 4) to a position in which the actuator member 184 is disposed in axial alignment with the index pin 150. As the actuator member 184 is moved into axial alignment with the index pin 150, the cam surface 188 on the actuator member 184 forces the index pin 150 to move toward the left from the engaged position shown in FIG. 4 to the disengaged position shown in FIG. 5. As this occurs, the cylindrical body 160 of the index pin 150 moves out of engagement with the recess 146 (FIG. 4) in the index wheel 138.

Upon disengagement of the cylindrical body 160 of the index pin 150 from the recess 146, the index wheel 138 is released for rotation in a counterclockwise direction (as viewed in FIG. 3) relative to the sector gear 16 under the influence of the power spring 100. However, the index wheel 138 is held against rotation relative to the force transmitting member 60 by the pin 120 (FIG. 2). Therefore, force is transmitted from the power spring 100 through the inner wall 112 of the casing assembly 106 to the force transmitting member 60.

The force transmitted from the power spring 100 results in the force transmitting member 60 being rotated with the index wheel 138 relative to the end wall 36 of the housing 30 and the sector gear 16. As this occurs, the external thread convolution 92 on the force transmitting member 60 interacts with the internal thread convolution 94 on the sector gear 16. The thread convolutions 92 and 94 effect movement of the sector gear 16 toward the left (as viewed in FIGS. 1 and 2) to reduce the clearance between the sector gear teeth 18 (FIG. 1) and rack gear teeth 20.

As the index wheel 138 rotates through the angular distance indicated at 156 in FIG. 3, one of the teeth 144 moves out of alignment with the index pin 152 and an adjacent recess 146 moves into alignment with the index pin 152. As this occurs, a cylindrical body 160 on the index pin 152 snaps into the recess under the influence of a biasing spring similar to the biasing spring 168 for the index pin 150 (FIG. 4). This results in the index wheel 138 being locked against rotational movement relative to the sector gear 16 by the index pin 152.

At this time, one of the teeth 144 will be disposed in radial alignment with the index pin 150. The index wheel tooth which is aligned with the index pin 150 holds the index pin 150 in the disengaged position. Although only the index pin 150 has been shown in FIGS. 4 and 5, it should be understood that the index pin 152 has the same construction and cooperates with the sector gear 16 and index wheel 138 in the same manner as does the index pin 150.

During a subsequent steering operation, the rack gear 14 (FIG. 1) is moved axially by a power steering motor (not shown) to effect rotation of the sector gear 16 and turning movement of steerable vehicle wheels. As this occurs, the index pin 152 remains in engagement with one of the recesses 146 to hold the index wheel 138 against rotation under the influence of the power spring 100. Therefore, during turning of the steerable vehicle wheels, the sector gear teeth 18 are not pressed against the rack gear teeth 20 with a force which could tend to cause binding between the sector gear teeth 18 and rack gear teeth 20 (FIG. 1).

Upon completion of a steering operation, the sector gear 16 is again returned to the on-center condition. As this occurs, the index pin 152 moves into alignment with an actuator member 198 (FIG. 2). The actuator member 198 has the same construction as the actuator member 184 (FIG. 5). The actuator member 198 engages the head end portion 180 (FIG. 3) of the index pin 152. This results in the index pin 152 being moved from an engaged condition to a disengaged condition in the manner previously explained in conjunction with the index pin 150.

Movement of the index pin 152 to the disengaged position releases the index wheel 138 for rotational movement in a counterclockwise direction (FIG. 3) under the influence of the power spring 100 (FIG. 2). After the index wheel 138 has moved through the angular distance indicated at 156 in FIG. 3, the index pin 150 snaps into a recess 146 in the index wheel 138 in the manner shown in FIGS. 3 and 4. At this time, the index pin 152 will be held in the disengaged position by one of the teeth 144 on the index wheel 138.

In the illustrated embodiment of the invention, the index wheel 138 has an even number of teeth 144 and the index pin 152 is offset from an axis through the index pin 150 by the angular distance 156 (see FIG. 3). If the index wheel 138 was constructed with an odd number of teeth 144, the index pin 152 would be aligned with the index pin 150.

It should be understood that wear of the sector gear teeth 18 and rack gear teeth 20 will occur over an extended period of use of the apparatus 10 (FIG. 1). Therefore, the lash adjustment assembly 46 will only be operated to move the sector gear 16 along the axis 24 to reduce clearance between the sector gear teeth 18 and rack gear teeth 20 after a substantial number of operations of the apparatus 10 to turn steerable vehicle wheels. Although one specific construction for the index assembly 134 as been illustrated in FIGS. 1–5, it is contemplated that the index assembly 134 could have a different construction if desired.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in turning steerable vehicle wheels, said apparatus comprising:
   a first gear which is rotatable to and from an initial condition about a first axis;
   a second gear having teeth disposed in meshing engagement with teeth on said first gear; and
   adjustment means for moving said first gear through a predetermined distance along said first axis to reduce clearance between teeth of said first and second gears upon rotation of said first gear to the initial condition;
   said adjustment means including a threaded member which engages a thread convolution on an internal portion of said first gear to move said first gear along said first axis, spring means for storing energy to effect rotation of said threaded member relative to said first gear, and index means for limiting rotation of said threaded member relative to said first gear under the influence of force transmitted from said spring means to a predetermined arcuate distance upon rotation of the first gear to the initial condition.

2. An apparatus as set forth in claim 1 wherein said first gear includes surface means for defining a recess, said spring means and at least a portion of said threaded member being disposed in said recess in said first gear.

3. An apparatus for use in turning steerable vehicle wheels, said apparatus comprising:
   a first gear;
   a second gear having teeth disposed in meshing engagement with teeth on said first gear;
   a housing at least partially enclosing said first and second gears;
   a first thread convolution fixedly connected with said first gear;
   a rotatable force transmitting member having a second thread convolution on a first end portion of said force transmitting member, said second thread convolution being disposed in engagement with said first thread convolution, said force transmitting member having a second end portion connected with and rotatable relative to said housing; and
   a spring connected with said force transmitting member and said first gear to effect rotation of said force transmitting member relative to said first thread convolution and said housing under the influence of energy stored in said spring to move said first gear under the influence of force transmitted through said first and second thread convolutions during rotation of said force transmitting member to thereby reduce clearance between teeth on said first and second gears.

4. An apparatus as set forth in claim 3 further including means for limiting the extent of rotation of said force transmitting member to a predetermined arcuate distance relative to said first gear to thereby limit the extent of movement of said first gear relative to said second gear under the influence of energy stored in said spring.

5. An apparatus as set forth in claim 3 further including a retaining member disposed on said first gear and movable between an engaged condition retaining said force transmitting member against rotation relative to said first gear and a disengaged condition in which said retaining member is ineffective to retain said force transmitting member against rotation relative to said first gear, and an actuator member disposed on said housing and engageable with said retaining member to move said retaining member from the engaged condition to the disengaged condition upon rotation of said first gear to a predetermined position relative to said housing.

6. An apparatus as set forth in claim 5 wherein said retaining member is movable between the engaged and disengaged conditions along a path which extends parallel to an axis about which said force transmitting member is rotatable relative to said first gear.

7. An apparatus as set forth in claim 3 wherein said first gear is rotatable relative to said second gear about a first axis, said force transmitting member being rotatable relative to said first gear about said first axis, said first gear having an end portion through which said first axis extends, said apparatus further includes bearing means disposed between said housing and said end portion of said first gear to support said first gear for rotation relative to said housing, an index member fixedly connected with said force transmitting member for rotation therewith relative to said housing, said index member being disposed between said end portion of said first gear and said housing, a retainer member mounted on said end portion of said first gear and movable relative to said first gear between an engaged condition in which said retainer member is effective to retain said index member against rotation relative to said first gear and a disengaged condition in which said retainer member is ineffective to retain said index member against rotation relative to said first gear, and an actuator member connected with said housing and extending into space between said end portion of said first gear and said housing to effect movement of said retainer member from the engaged condition to the disengaged condition upon rotation of said first gear to a predetermined position relative to said housing.

8. An apparatus as set forth in claim 7 further including a second retainer member mounted on said end portion of said first gear and movable relative to said first gear between an engaged condition in which said second retainer member is effective to retain said index member against rotation relative to said first gear and a disengaged condition in which said second retainer member is ineffective to retain said index member against rotation relative to said first gear.

9. An apparatus for use in turning steerable vehicle wheels, said apparatus comprising:

a first gear which is rotatable to and from an initial condition about a first axis, a second gear having teeth disposed in meshing engagement with teeth on said first gear; and adjustment means for moving said first gear through a predetermined distance along said first axis to reduce clearance between teeth of said first and second gears upon rotation of said first gear to the initial condition;

said adjustment means including an index wheel mounted on and rotatable relative to said first gear as said first gear moves along said first axis, and an index member which is engageable with said index wheel to block rotation of said index wheel relative to said first gear upon movement of said first gear through the predetermined distance along said first axis.

10. An apparatus for use in turning steerable vehicle wheels, said apparatus comprising:

a first gear which is rotatable to and from an initial condition about a first axis, a second gear having teeth disposed in meshing engagement with teeth on said first gear; and adjustment means for moving said first gear through a predetermined distance along said first axis to reduce clearance between teeth of said first and second gears upon rotation of said first gear to the initial condition;

said adjustment means including a force transmitting member which is movable relative to said first gear to effect movement of said first gear along said first axis, an index member which is mounted on said first gear and is movable along an axis which is parallel to said first axis from an engaged position to a disengaged position to release said force transmitting member, and actuator means for moving said index member along the axis parallel to said first axis from the engaged position to the disengaged position upon movement of said first gear to the initial position.

* * * * *